(12) United States Patent
Nishita et al.

(10) Patent No.: US 12,013,239 B2
(45) Date of Patent: Jun. 18, 2024

(54) MARKING SYSTEM AND MARKING METHOD

(71) Applicant: Topcon Corporation, Tokyo (JP)

(72) Inventors: Nobuyuki Nishita, Tokyo (JP); Toshio Yamada, Tokyo (JP)

(73) Assignee: Topcon Corporation, Tokyo (JP)

( * ) Notice: Subject to any disclaimer, the term of this patent is extended or adjusted under 35 U.S.C. 154(b) by 485 days.

(21) Appl. No.: 17/449,095

(22) Filed: Sep. 28, 2021

(65) Prior Publication Data
US 2022/0099443 A1     Mar. 31, 2022

(30) Foreign Application Priority Data

Sep. 29, 2020 (JP) ................................ 2020-162995

(51) Int. Cl.
*G01C 15/06* (2006.01)

(52) U.S. Cl.
CPC .................................... *G01C 15/06* (2013.01)

(58) Field of Classification Search
CPC .................................................... G01C 15/06
See application file for complete search history.

(56) References Cited

U.S. PATENT DOCUMENTS

| | | | | |
|---|---|---|---|---|
| 5,137,354 A | * | 8/1992 | deVos .................. | G01C 15/002 356/141.5 |
| 5,539,990 A | * | 7/1996 | Le ........................ | G01C 15/004 356/138 |
| 11,226,199 B2 | * | 1/2022 | Unger .................... | G01C 3/08 |
| 11,709,262 B2 | * | 7/2023 | Fischell ................ | G01S 13/505 342/41 |
| 11,733,043 B2 | * | 8/2023 | Hinderling ........... | G01C 15/002 356/4.01 |
| 11,802,764 B2 | * | 10/2023 | Unger .................... | G01S 7/003 |
| 11,859,976 B2 | * | 1/2024 | Walser .................. | G01S 7/4816 |
| 11,933,611 B2 | * | 3/2024 | Sasaki .................. | G01C 11/025 |
| 2012/0198711 A1 | * | 8/2012 | Hayes .................. | G01C 15/006 33/227 |
| 2012/0203502 A1 | * | 8/2012 | Hayes .................... | G01S 17/89 702/155 |
| 2019/0056215 A1 | * | 2/2019 | Hayes .................... | G01S 7/481 |
| 2022/0099440 A1 | * | 3/2022 | Unger .................... | G01C 15/06 |
| 2022/0099443 A1 | * | 3/2022 | Nishita .................. | G01C 15/06 |

FOREIGN PATENT DOCUMENTS

JP          5538929 B      7/2014
WO   WO-2023162564 A1 *  8/2023

* cited by examiner

*Primary Examiner* — Yaritza Guadalupe-McCall
(74) *Attorney, Agent, or Firm* — Chiesa Shahinian & Giantomasi PC

(57) ABSTRACT

An external controller specifies the direction of a surveying instrument with respect to a laser marking instrument to calculate a first relative angle as an angle relative to the surveying instrument, calculates a second relative angle as an angle relative to a target line based on design information, and calculates a differential angle between the first relative angle and the second relative angle, thereby rotating a marking laser emitter by the differential angle to project marking laser light onto the target line.

7 Claims, 10 Drawing Sheets

MARKING SYSTEM AND MARKING METHOD

TECHNICAL FIELD

The present disclosure relates to a marking system and a marking method.

BACKGROUND

At a construction site, a laser marking instrument has been used, which projects a reference line on a structure such as a column, a beam, a floor surface, a wall surface, or a ceiling surface or a ground surface by means of laser light. A general laser marking instrument can project marking lines including at least a vertical line and a horizontal line.

At the construction site, after the laser marking instrument has been positioned at a predetermined position based on a design, the marking line is projected, and marking (marking of the reference line) and installation of a structure, a wire, a facility, etc. are performed based on the marking line. This laser marking instrument needs to be arranged on, e.g., the reference line or an intersection (a ground marking point) between a plurality of reference lines, and such positioning at the predetermined position is performed using a surveying instrument that measures the position of the laser marking instrument, such as a total station.

For example, in Japanese Patent No. 5538929, an incident angle sensor is provided on a side surface of a laser marking instrument (a measurement/marking apparatus) including a laser distance meter 14 supported on a two-degree-of-freedom rotation mechanism and laser light from a total station (a three-dimensional measurement instrument) contacts the incident angle sensor of the laser marking instrument arranged at a marking position, and in this manner, a position relative to the total station is measured and the orientation of the laser marking instrument is determined.

SUMMARY

However, in the technique described in Japanese Patent No. 5538929, since the incident angle sensor is used for the laser marking instrument to measure the position relative to the total station, the incident angle sensor needs to be directed to a total station side after the laser marking instrument has been arranged at the marking position and the position of the laser marking instrument has been measured with a prism facing the total station. As described above, in the laser marking instrument described in Japanese Patent No. 5538929, a marking process cannot be performed without an arrangement step, a position measurement step, and the step of measuring the position relative to the total station. In addition, the incident angle of the laser light from the total station needs to be calculated, and for this reason, there are problems that arithmetic processing is complicated and an arithmetic load is great.

In order to solve these problems, it is an objective of the present disclosure to provide a marking system and a marking method capable of more easily performing a marking process and improving the efficiency of the marking process.

In order to accomplish the above-described objective, the marking system according to the present disclosure includes a surveying device that is able to survey the position of a survey target, a marking laser emitter that is provided with the survey target and is able to emit laser light to project a laser marking line on a target portion, a first relative angle calculator that is able to specify the direction of the surveying device with respect to the marking laser emitter to calculate a first relative angle as the horizontal angle of the surveying device relative to the marking laser emitter, a second relative angle calculator that is able to specify the direction of a target marking position with respect to the marking laser emitter to calculate a second relative angle as the horizontal angle of the target marking position relative to a laser radiation direction of the marking laser emitter, a differential angle calculator that calculates a differential angle between the first relative angle and the second relative angle, and a horizontal rotation driver that rotates the marking laser emitter with respect to the specified direction of the surveying device by the differential angle.

In order to accomplish the above-described objective, the marking method according to the present disclosure is a marking method in a marking system including a surveying device that is able to survey the position of a survey target and a marking laser emitter that is provided with the survey target and is able to emit laser light to project a laser marking line on a target portion, the method including the first relative angle calculation of specifying the direction of the surveying device with respect to the marking laser emitter to calculate a first relative angle as the horizontal angle of the surveying device relative to the marking laser emitter, the second relative angle calculation of specifying the direction of a target marking position with respect to the marking laser emitter to calculate a second relative angle as the horizontal angle of the target marking position relative to a laser radiation direction of the marking laser emitter, the differential angle calculation of calculating a differential angle between the first relative angle and the second relative angle, and the horizontal rotation driving of rotating the marking laser emitter with respect to the specified direction of the surveying device by the differential angle.

According to the marking system and the marking method of the present disclosure, the marking process can be more easily performed, and the efficiency of the marking process can be improved.

DETAILED DESCRIPTION

Hereinafter, embodiments of the present disclosure will be described in detail with reference to the drawings.

First Embodiment

Figure 1:
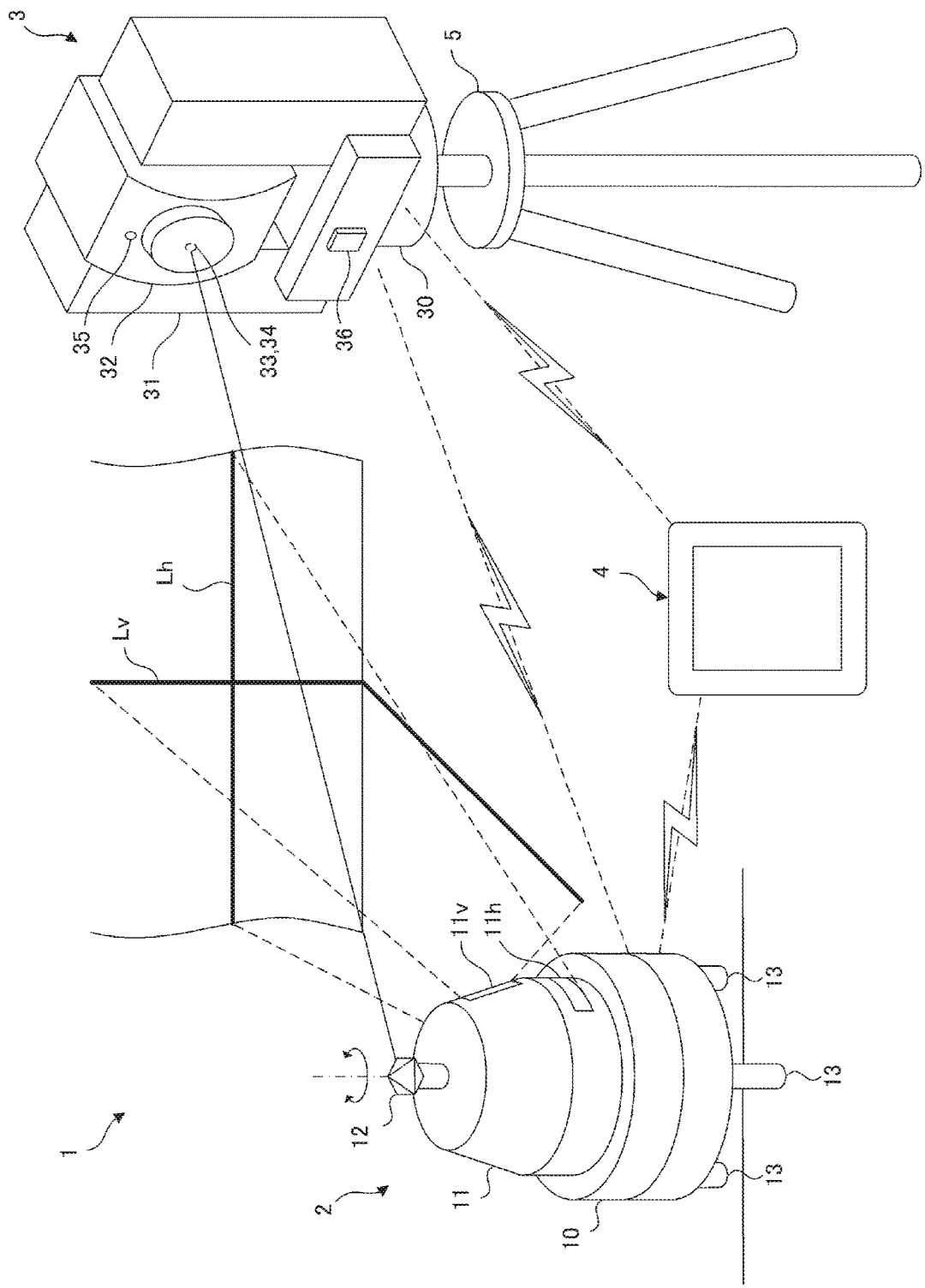
FIG. 1 is a view of an overall configuration of a marking system of a first embodiment of the present disclosure.
Figure 2:
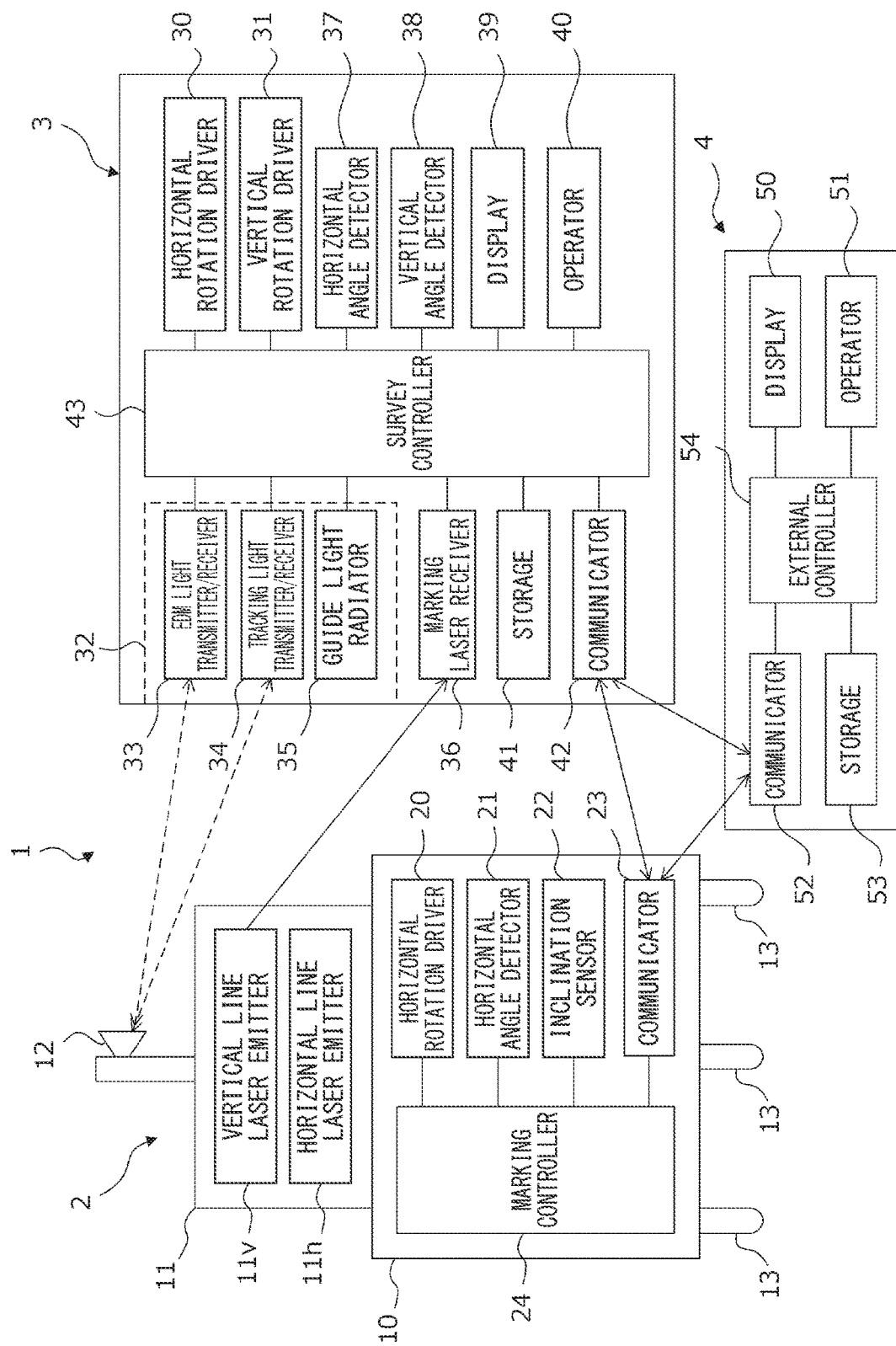
FIG. 2 is a control block diagram of the marking system of the first embodiment of the present disclosure.

FIG. 1 is a view of an overall configuration of a marking system according to a first embodiment of the present disclosure, and FIG. 2 is a control block diagram of the marking system. The overall configuration and a control system of the marking system of the first embodiment of the present disclosure will be described with reference to FIGS. 1 and 2. Note that the scale of each apparatus in FIG. 1 is different from an actual size for the sake of convenience in description.

The marking system 1 has a laser marking instrument 2, a surveying instrument 3 (a surveying device) that surveys the position of the laser marking instrument 2, and an external control terminal 4 that communicates with the laser marking instrument 2 and the surveying instrument 3 and is able to control each apparatus.

The laser marking instrument 2 is provided with a horizontally-rotatable marking laser emitter 11 on a main body 10, and is provided with a prism 12 as a survey target of the surveying instrument 3 on the marking laser emitter 11. The prism 12 is provided on the vertical rotation axis of the marking laser emitter 11. The prism 12 of the present embodiment is a reflection prism capable of reflecting incident light at least from any direction of 360° in the horizontal direction. Note that the survey target provided at the laser marking instrument 2 is not limited to the prism 12, and may be a reflection sheet etc. Although the prism 12 is preferably arranged on the vertical rotation axis of the marking laser emitter 11 as in the present embodiment, the position of the prism 12 is not limited to such a position and the prism 12 can be provided at a position offset from the vertical rotation axis.

Three leg portions 13 are provided on a bottom portion of the main body 10, and at least two of the leg portions 13 can be extended/contracted to level the laser marking instrument 2. Note that description will be made below based on an assumption that the laser marking instrument 2 has been leveled. That is, it is assumed that the vertical axis of the laser marking instrument 2 is coincident with the vertical direction of an installation point.

The marking laser emitter 11 includes a vertical laser emitter 11v that emits laser light (vertical laser light) for projecting a vertical line Lv and a horizontal laser emitter 11h that emits laser light (horizontal laser light) for projecting a horizontal line Lh. Note that although not shown in the figure, a laser emitter that emits point-like laser light may be provided immediately below the center of the main body 10 in order to position a ground marking point etc.

The vertical laser emitter 11v performs scanning in the vertical direction of the marking laser emitter 11 with the laser light so that the vertical line Lv can be projected from a ground surface or a bottom surface to a wall surface or a ceiling surface, for example. Hereinafter, the orientation (the orientation about the vertical axis) of the marking laser emitter 11 in the horizontal direction will be described with reference to the orientation of the vertical laser emitter 11v, i.e., a vertical line projection direction.

The horizontal laser emitter 11h performs scanning in a direction perpendicular to the vertical direction of the marking laser emitter 11, i.e., the horizontal direction, with the laser light so that the horizontal line Lh can be projected on a wall surface, for example. Note that the lines that can be projected by the marking laser emitter 11 are not limited to the vertical line Lv and the horizontal line Lh. For example, in addition to the vertical line Lv in a reference orientation (0°), a vertical line at an orientation of 90° in a right-left direction, i.e., the horizontal direction, and a vertical line at an orientation of 180° can be projected.

The surveying instrument 3 is a total station capable of automatically tracking the prism 12 as the survey target, and is supported by a tripod 5 capable of extending/contracting in the vertical direction. In the surveying instrument 3, a telescope 32 is provided on a horizontal rotation driver 30 that can be rotatably driven in the horizontal direction through a vertical rotation driver 31 that can be rotated in the vertical direction. Further, the telescope 32 is provided with an EDM light transmitter/receiver (an electronic distance meter) 33 that emits and receives distance measurement light and measures a slope distance to the prism 12 and a tracking light transmitter/receiver 34 that emits and receives tracking light for tracking the prism 12.

A guide light radiator 35 is formed at the telescope 32. The guide light radiator 35 is an element that emits guide light for showing an operating person a collimation direction of the EDM light transmitter/receiver 33. Such guide light is visible light emitted in the same direction as that of the distance measurement light.

Further, the surveying instrument 3 is provided with a marking laser receiver 36 capable of sensing marking laser light emitted from the laser marking instrument 2. As shown in FIG. 1, the marking laser receiver 36 of the present embodiment is arranged at a lower portion of a main body of the surveying instrument 3. In the surveying instrument 3 of the present embodiment, the EDM light transmitter/receiver 33, the tracking light transmitter/receiver 34, the guide light radiator 35, and the marking laser receiver 36 are arranged on the same vertical line as viewed from the front of the surveying instrument 3.

The surveying instrument 3 can measure a distance (the slope distance) from the surveying instrument 3 to the prism 12 and can measure a horizontal angle and a vertical angle by prism survey taking the prism 12 as the survey target. Thus, the surveying instrument 3 is installed at a known position and surveys the prism 12 with the posture of the surveying instrument 3 being leveled, and therefore, the coordinates of the prism 12, i.e., the position of the laser marking instrument 2, can be calculated from survey results (the slope distance, the horizontal angle, and the vertical angle). More specifically, the surveying instrument 3 has an instrument point as a reference for survey, and calculates absolute coordinates with reference to the known-point coordinates of the instrument point with respect to the known installation position in consideration of an instrument height. Note that in a case where the surveying instrument 3 cannot be installed at the known position, the coordinates of the instrument point may be calculated from a known reference point by the method of resection, for example.

In addition, the surveying instrument 3 receives the tracking light reflected on the prism 12 through the tracking light transmitter/receiver 34, and is driven in the horizontal direction by the horizontal rotation driver 30 and in the vertical direction by the vertical rotation driver 31, and therefore, can automatically track the prism 12, i.e., the laser marking instrument 2.

The external control terminal 4 is a tablet terminal capable of remotely operating the laser marking instrument 2 and the surveying instrument 3 and receiving the survey results of the surveying instrument 3. Note that the external control terminal 4 is not limited to the tablet terminal, and may be any information processing terminal including a computer, such as a smartphone or a personal computer.

As shown in FIG. 1, the marking system 1 is a system that performs survey by tracking the laser marking instrument 2 (precisely, the prism 12) by the surveying instrument 3 at, e.g., a construction site, the laser marking instrument 2 being installed at a predetermined position to project the vertical line Lv and/or the horizontal line Lh in a target direction.

Next, internal configurations of the laser marking instrument 2, the surveying instrument 3, and the external control terminal 4 of the marking system 1 will be described with reference to FIG. 2.

As shown in FIG. 2, the laser marking instrument 2 is provided with a horizontal rotation driver 20, a horizontal angle detector 21, an inclination sensor 22, a communicator 23, and a marking controller 24 in the main body 10 in addition to the main body 10, the marking laser emitter 11, the prism 12, and the leg portions 13 as described above. Note that although not shown, the laser marking instrument 2 is provided with an operator capable of manually radiating the laser light from the vertical laser emitter 11v and/or the horizontal laser emitter 11h or stopping such radiation.

The horizontal rotation driver 20 has the function of rotatably driving the marking laser emitter 11 in the horizontal direction (about the vertical axis) relative to the main body 10. In particular, the horizontal rotation driver 20 can rotate the marking laser emitter 11 to a specified angle.

The horizontal angle detector 21 detects the rotation angle (the horizontal angle) of the horizontal rotation driver 20 in the horizontal direction, thereby detecting the horizontal angle at which the marking laser emitter 11 is oriented, i.e., a radiation direction of the vertical laser emitter 11v.

The inclination sensor 22 is a sensor capable of detecting inclination of the main body 10, and for example, is a horizontal tilt sensor including a circular bubble tube. Inclination can be detected by the inclination sensor 22, and leveling can be performed by adjustment of the leg portions 13 according to such inclination. Leveling may be performed manually by the operating person, or may be performed automatically under the control of the marking controller 24.

The communicator 23 is an element capable of communicating with external equipment such as a communicator 42 of the surveying instrument 3 or a communicator 52 of the external control terminal 4, and is wireless communication means such as the Bluetooth (the registered trademark), a wireless LAN, or optical communication. Note that the communicator 23 may have wired communication means via a connection terminal (the same also applies to the following communicators).

The marking controller 24 is electrically connected to the horizontal rotation driver 20, the horizontal angle detector 21, the inclination sensor 22, and the communicator 23 as described above, and can transmit/receive various types of information. Moreover, the marking controller 24 can control the horizontal rotation driver 20 and the marking laser emitter 11 according to an instruction from the later-described external control terminal.

In the surveying instrument 3, a horizontal angle detector 37, a vertical angle detector 38, a display 39, an operator 40, a storage 41, and a communicator 42 are electrically connected to a survey controller 43 in addition to the horizontal rotation driver 30, the vertical rotation driver 31, the EDM light transmitter/receiver 33, the tracking light transmitter/receiver 34, the guide light radiator 35, and the marking laser receiver 36 as described above. Note that although not shown in the figure, the surveying instrument 3 is also provided with an inclination sensor (which may be a bubble tube) for leveling as in the laser marking instrument 2 and manual or automatic leveling is allowed.

The horizontal angle detector 37 of the surveying instrument 3 detects the angle (the horizontal angle) of rotation in the horizontal direction by the horizontal rotation driver 30, thereby detecting the horizontal angle collimated by the telescope 32. The vertical angle detector 38 detects the angle (the vertical angle) of rotation in the vertical direction by the vertical rotation driver 31, thereby detecting the vertical angle collimated by the telescope 32. The survey controller 43 can output, as the survey results, the horizontal angle and the vertical angle detected by the horizontal angle detector 37 and the vertical angle detector 38.

The display 39 is, e.g., a liquid crystal monitor, and can display various types of information on the surveying instrument 3, such as the survey results (the slope distance, the horizontal angle, the vertical angle). Moreover, the display 39 can also display information acquired from the laser marking instrument 2 and the external control terminal 4 via the communicator 42.

The operator 40 is operation means that inputs various operation instructions and settings to the survey controller 43. Examples of the operation instruction include switching between ON and OFF of a power supply, a trigger for starting survey, switching of a survey mode, and a survey cycle setting. Moreover, the operator 40 may include an optional operation or input device such as a switch, a button, or a dial. Note that in a case where the display 39 is a touch panel, the display 39 and the operator 40 may be integrated.

The storage 41 can store a program for the above-described tracking function, various survey programs such as a program for performing survey in a predetermined survey cycle, the survey results, etc.

As in the communicator 23 of the laser marking instrument 2 as described above, the communicator 42 is an element capable of communicating with the external equipment, and for example, is wireless communication means such as the Bluetooth (the registered trademark) or a wireless LAN.

The survey controller 43 can execute control related to the above-described survey and tracking functions. When the vertical laser light from the laser marking instrument 2 has been sensed by the marking laser receiver 36, such information is transmitted to the external control terminal 4 or the laser marking instrument 2 via the communicator 42.

The external control terminal 4 has a display 50, an operator 51, the communicator 52, and a storage 53, and configuration requirements for each element are similar to those for the display 39, the operator 40, the storage 41, and the communicator 42 of the surveying instrument 3 as described above. Specifically, the display 50 is a touch panel, and also serves as the operator 51. The communicator 42 is wireless communication means such as the Bluetooth (the registered trademark), a wireless LAN, or optical communication. The storage 53 stores a program to be executed by the external controller 54, the survey results acquired from the surveying instrument 3, design information, etc.

The external controller 54 can remotely operate the laser marking instrument 2 and the surveying instrument 3 via the communicator 52. For example, the external controller 54 can remotely operate the surveying instrument 3 to perform setting for survey or tracking, or can remotely operate the laser marking instrument 2 to emit the laser light from the vertical laser emitter 11*v* and/or the horizontal laser emitter 11*h*.

In addition, the external controller 54 of the present embodiment has the function (a first relative angle calculator) of specifying the direction of the surveying instrument 3 with respect to the laser marking instrument 2 (the laser emitter) to detect a first relative angle $\alpha$ ($=\varphi+180°$) which is the horizontal angle of the surveying instrument 3 relative to the laser marking instrument 2 from the survey results (in particular, the horizontal angle $\varphi$) obtained by the surveying instrument 3. That is, the external controller 54 specifies the orientation of the laser marking instrument 2 with reference to the installed surveying instrument 3 (i.e., the coordinates are specified), thereby adjusting the orientation of the laser marking instrument 2 to site coordinates (a design). Note that the site coordinates are not limited to an absolute coordinate system such as a geographic coordinate system, and may be a limited coordinate system adapted only to such a site.

In particular, the external controller 54 in the present embodiment can acquire, via the communicator 52, information indicating that the marking laser receiver 36 of the surveying instrument 3 has sensed reception of the vertical laser light emitted from the vertical laser emitter 11*v*. Then, the external controller 54 rotates the marking laser emitter 11 by the horizontal rotation driver 20 while the vertical laser light is being emitted from the vertical laser emitter 11*v* of the laser marking instrument 2 and stops rotation of the marking laser emitter 11 by the horizontal rotation driver 20 in response to acquisition of the information indicating that the marking laser receiver 36 of the surveying instrument 3 has sensed the vertical laser light, thereby specifying the direction of the surveying instrument 3 with respect to the laser marking instrument 2.

Moreover, the external controller 54 has the function (a second relative angle calculator) of specifying the direction of a target marking position (a target line Lt) with respect to the laser marking instrument 2 from the design information etc. to calculate a second relative angle $\beta$ which is the horizontal angle of the target marking position relative to the orientation (the radiation direction of the vertical laser light) of the laser marking instrument 2.

The marking controller 24 has the function (a differential angle calculator) of calculating a differential angle $\gamma$ ($=\beta-\alpha$) between the first relative angle $\alpha$ and the second relative angle $\beta$, and can rotate the marking laser emitter 11 by the horizontal rotation driver 20 by the differential angle.

The external controller 54 has the guiding function of guiding the laser marking instrument 2 including the prism 12 to a predetermined position by means of the tracking function of the surveying instrument 3. Specifically, the external controller 54 specifies the predetermined position at which the laser marking instrument 2 is to be installed from the design information, and issues a guiding instruction based on a difference between the position of the laser marking instrument 2 obtained from the survey results of the surveying instrument 3 and the predetermined position at which the laser marking instrument 2 is to be installed (a guiding device). As the guiding instruction, an orientation and a distance from the current position of the laser marking instrument 2 to the predetermined position at which the laser marking instrument 2 is to be installed are displayed on the display 50, for example. Note that the survey controller 43 of the surveying instrument 3 may have such a guiding function. The guiding instruction is not limited to a displayed indication, and may be guidance via voice.

Figure 3:
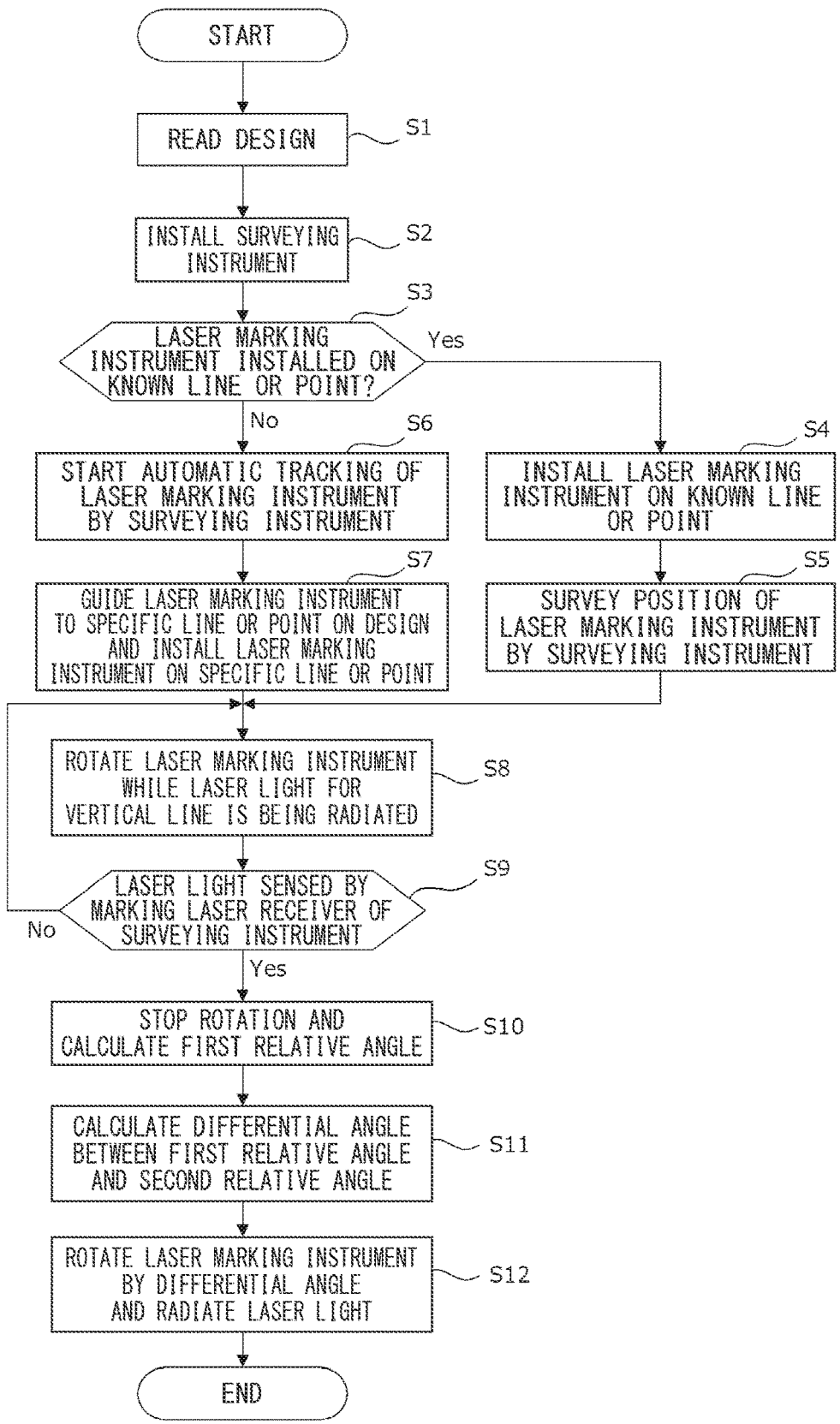
FIG. 3 is a flowchart of a marking method of the first embodiment.
Figure 4A:
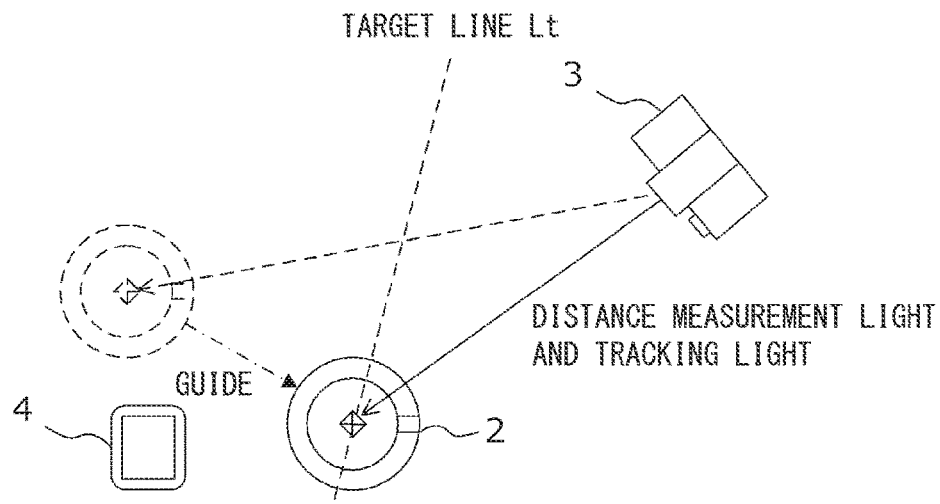
FIGS. 4A-4C show schematic top views for describing step examples of the marking method of the first embodiment.

Referring now to FIGS. 3 and 4, FIG. 3 shows the flowchart of the marking method of the first embodiment, and FIG. 4 shows schematic top views for describing step examples (a) to (c) of the marking method of the first embodiment. Hereinafter, the marking method of the first embodiment will be described along the flowchart of FIG. 3 while FIG. 4 is referred in the middle.

First, as Step S1, the external control terminal 4 reads the design information on the construction site where marking is to be performed. For example, regarding reading of such design information, the operating person may manually cause the external controller 54 to read the design information stored in the storage 53, or may acquire and read the design information from the storage 41 of the surveying instrument 3 or other external apparatuses via the communicator 52.

As Step S2, the operating person installs the surveying instrument 3. Instrument installation may be performed by a typically-known method.

As Step S3, the operating person determines whether or not the laser marking instrument 2 is to be installed on a known line (a ground marking line) or a known point (e.g., a ground marking point) on the design. In a case where such a determination result is true (Yes), i.e., in a case where, e.g., the ground marking line or the ground marking point has already been shown on the construction site and the target installation position is clear, the process proceeds to Step S4.

As Step S4, the operating person installs the laser marking instrument 2 on the known line or point. At this point, the process of leveling the laser marking instrument 2 is also performed.

As Step S5, the surveying instrument 3 surveys the position of the laser marking instrument 2. Such survey is performed in such a manner that the prism 12 provided at the laser marking instrument 2 is searched and surveyed by the automatic tracking function of the surveying instrument 3, for example. After such survey, the process proceeds to Step S8.

On the other hand, in a case where the determination result is false (No) at Step S3 above, i.e., in a case where, e.g., the ground marking line or the ground marking point is not shown on the construction site and the target installation position is not clear, the process proceeds to Step S6.

As Step S6, the surveying instrument 3 starts automatic tracking of the laser marking instrument 2. That is, the surveying instrument 3 searches and surveys the prism 12 provided at the laser marking instrument 2 to specify information on the position of the laser marking instrument 2, and the process proceeds to next Step S7.

As Step S7, the external control terminal 4 (or the surveying instrument 3) guides the laser marking instrument 2 onto a specific line or point on the design, and the laser marking instrument 2 is installed. Specifically, since the information on the position of the laser marking instrument 2 is specified by the surveying instrument 3 at Step S6 and information on the position of the line (the target line Lt) on which the laser marking instrument 2 is to be installed is specified from the design information, the laser marking instrument 2 is guided onto the target line Lt via, e.g., the display 50 (or the display 39) of the external control terminal 4 (or the surveying instrument 3) based on a relative position difference between these types of position information, as shown in FIG. 4(*a*). Following such guidance, the operating person installs the laser marking instrument 2 on the target line Lt. At this point, the process of leveling the laser marking instrument 2 is also performed.

As Step S8, the external controller 54 of the external control terminal 4 rotates the marking laser emitter 11 in the horizontal direction by drive of the horizontal rotation driver 20 while the vertical laser light for projecting the vertical line Lv is being emitted from the vertical laser emitter 11v of the laser marking instrument 2.

Then, at Step S9, the external controller 54 of the external control terminal 4 determines whether or not the marking laser receiver 36 of the surveying instrument 3 has sensed the vertical laser light. In a case where such a determination result is false (No), the process returns to Step S8 above, and the external controller 54 continues radiation of the vertical laser light from the laser marking instrument 2 and rotation of the laser marking instrument 2.

Figure 4B:
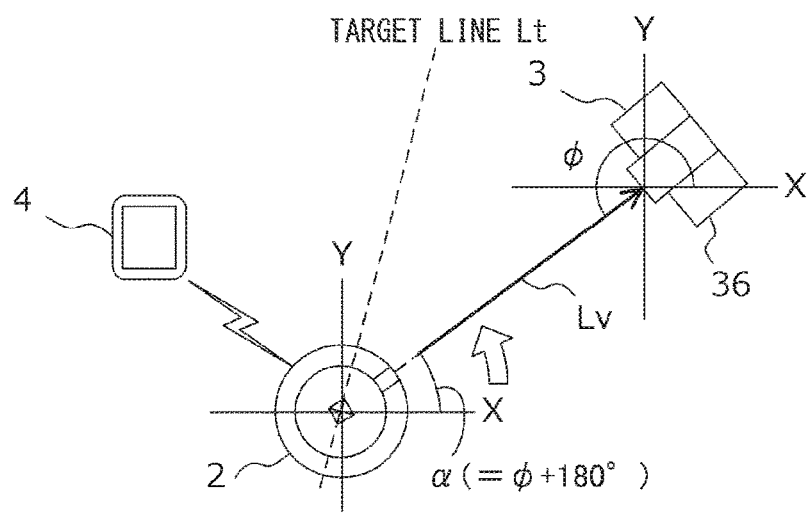

On the other hand, in a case where the determination result is true (Yes), i.e., in a case where the external controller 54 has acquired, from the surveying instrument 3, the information indicating that the marking laser receiver 36 has sensed the vertical laser light, the process proceeds to Step S10. Specifically, after the laser marking instrument 2 has rotated while radiating the vertical laser light for projecting the vertical line Lv as shown in FIG. 4(b), when the laser marking instrument 2 and the surveying instrument 3 face each other, the vertical laser light contacts the marking laser receiver 36 provided at the surveying instrument 3, and therefore, the determination result is true (Yes). That is, the direction of the surveying instrument 3 with respect to the laser marking instrument 2 is specified, and accordingly, the orientation of the laser marking instrument 2 on the construction site is fixed.

As Step S10, the external controller 54 of the external control terminal 4 stops rotation of the marking laser emitter 11 and calculates the first relative angle α as the relative angle between the laser marking instrument 2 and the surveying instrument 3 from the horizontal angle detected by the horizontal angle detector 21 at this point (a first relative angle calculation step), and the process proceeds to next Step S11. Specifically, since the laser marking instrument 2 and the surveying instrument 3 face each other as shown in FIG. 4(b), a direction obtained in such a manner that the horizontal angle φ as the survey result for the prism 12 by the surveying instrument 3 is inverted by 180° is the first relative angle α (=φ+180°) as the orientation of the laser marking instrument 2.

Figure 4C:
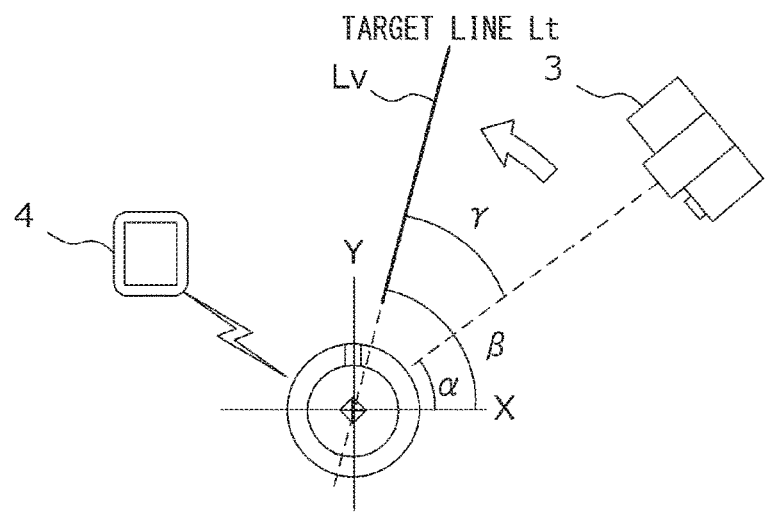

As Step S11, the external controller 54 of the external control terminal 4 calculates the second relative angle β as the relative angle between the laser marking instrument 2 and the target line Lt based on the design information (a second relative angle calculation step) and calculates the differential angle γ between the first relative angle α calculated at Step S10 and the second relative angle β (a differential angle calculation step), and the process proceeds to next Step S12. Specifically, since the orientation of the laser marking instrument 2 is specified as the first relative angle α at Step S10, the differential angle γ from the second relative angle β corresponding to the angle of the target line Lt on the design (XY coordinates) is calculated to determine the remaining angle that the marking laser emitter 11 needs to be further rotated, as shown in FIG. 4(c).

Then, as Step S12, after having driven the horizontal rotation driver 20 to rotate the marking laser emitter 11 to the target line Lt by the differential angle γ calculated at Step S11, the external controller 54 of the external control terminal 4 causes the vertical laser emitter 11v to emit the vertical laser light and causes the horizontal laser emitter 11h to emit the horizontal laser light such that the vertical line Lv and/or the horizontal line Lh are projected (a horizontal rotation drive step), and such a routine ends. Specifically, after the marking laser emitter 11 has been rotated by the differential angle γ calculated at Step S11 as shown in FIG. 4(c), the vertical laser light is emitted to project the vertical line Lv on the target line Lt.

As described above, in the marking system 1 and the marking method of the first embodiment, the external controller 54 of the external control terminal 4 specifies the direction of the surveying instrument 3 with respect to the laser marking instrument 2 to calculate the first relative angle α as the angle relative to the surveying instrument 3, calculates the second relative angle β as the angle relative to the target line Lt based on the design information, and calculates the differential angle γ between the first relative angle α and the second relative angle β, thereby rotating the marking laser emitter 11 by the differential angle γ to project the marking laser light on the target line Lt.

Moreover, in the marking system and the marking method, the orientation of the laser marking instrument 2 is specified based on the relative angle (the first relative angle α) between the laser marking instrument 2 and the surveying instrument 3 and the differential angle γ as the rotation angle to the target line Lt is calculated from such a relative angle, and therefore, the marking process can be executed by easy arithmetic processing. With this configuration, the laser marking line can be projected on an optional location, and, e.g., the process of actually drawing a marking line is not necessary. Moreover, the laser marking line can be directly projected on a necessary location, and therefore, an error upon continuous drawing of the marking line can be eliminated.

In particular, in the present embodiment, for specifying the relative angle between the laser marking instrument 2 and the surveying instrument 3, the vertical laser light emitted from the laser marking instrument 2 is utilized and sensed by the marking laser receiver 36 of the surveying instrument 3, and in this manner, the orientation of the laser marking instrument 2 is specified. With this configuration, the orientation of the laser marking instrument 2 can be easily specified without the need for, e.g., special arithmetic processing and a special additional component.

The external controller 54 of the present embodiment specifies the predetermined position at which the laser marking instrument 2 is to be installed from the design information, and issues the guiding instruction based on the difference between the position of the laser marking instrument 2 obtained from the survey results of the surveying instrument 3 and the predetermined position. With this configuration, the laser marking instrument 2 can be easily installed at a proper position.

The laser marking instrument 2 of the present embodiment is configured such that the prism 12 is provided on the rotation axis of the marking laser emitter 11, and therefore, no offset due to rotation of the marking laser emitter 11 is caused and an arithmetic load in the marking process can be further reduced.

With the above-described configuration, the marking process can be more easily performed and the efficiency of the marking process can be improved in the marking system 1 and the marking method according to the first embodiment.

Note that the case where the vertical line Vt is projected taking the ground surface or the floor surface as the target line Lt has been described as an example in the marking system 1 and the marking method of the above-described embodiment, but the vertical line Lv can be projected on a vertical target line Lt on a wall surface or the horizontal line Lh can be projected on a horizontal target line Lt on a wall surface in the marking system 1 and the marking method.

Figure 5A:
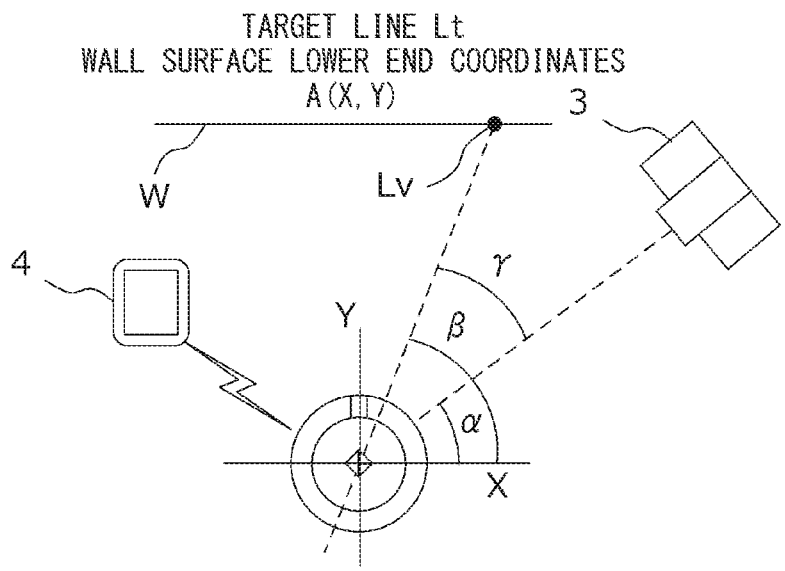
FIGS. 5A and 5B show schematic top views for describing step examples in the case of projecting a vertical line on a wall surface.
Figure 5B:
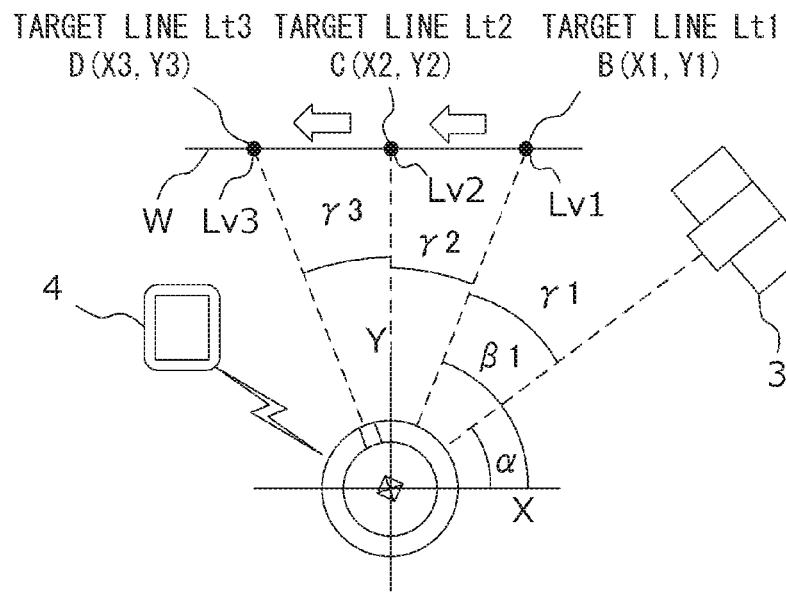

FIG. 5 shows schematic top views for describing step examples (a) and (b) in the case of projecting a vertical line on a wall surface.

Specifically, in a case where a single vertical line Lv is projected on the wall surface as shown in FIG. 5(*a*), when the external controller 54 of the external control terminal 4 reads the design information at Step S1 of the flowchart of FIG. 3, the X, Y coordinates of the horizontal plane position (e.g., the position of a lower end of a wall surface W) of the target line Lt is read from the design information.

The subsequent process is the same as that of the first embodiment, and the second relative angle β calculated at Step S11 is calculated as an orientation (a vector) from the position of the laser marking instrument 2 to the X, Y coordinates (e.g., wall surface lower end coordinates A(X, Y)) of the target line Lt. Then, the laser marking instrument 2 is rotated by the differential angle γ from the surveying instrument 3 to the X, Y coordinates of the target line Lt and the vertical laser light is emitted toward the X, Y coordinates of the target line Lt, and in this manner, the vertical line Lv can be projected along the target line Lt on the wall surface W.

By applying this configuration, a plurality of vertical lines Lv can be also projected on the wall surface W. Specifically, in a case where there is a plurality of target lines Lt1, Lt2, Lt3 on the wall surface W as shown in FIG. 5(*b*), the external controller 54 of the external control terminal 4 reads the wall surface lower end coordinates B(X1, Y1), C(X2, Y2), D(X3, Y3) of the target lines from the design information.

First, for the target line Lt1 close to the surveying instrument 3, the laser marking instrument 2 is, as described above, rotated by a differential angle γ1 from the surveying instrument 3 to the wall surface lower end coordinates B(X1, Y1) of the target line Lt1 and the vertical laser light is emitted toward the wall surface lower end coordinates B (X1, Y1), and in this manner, a vertical line Lv1 along the target line Lt1 on the wall surface W is projected.

Next, for the target line Lt2, a differential angle γ2 between an orientation (a vector) from the laser marking instrument 2 to the wall surface lower end coordinates C (X2, Y2) and an orientation (a vector) to the wall surface lower end coordinates B (X1, Y1) of the target line Lt1 is calculated, and the laser marking instrument 2 is further rotated by the differential angle γ2. Then, the vertical laser light is emitted toward the wall surface lower end coordinates C (X2, Y2), and in this manner, a vertical line Lv2 along the target line Lt2 on the wall surface W is projected.

Similarly, for the target line Lt3, a differential angle γ3 between an orientation (a vector) from the laser marking instrument 2 to the wall surface lower end coordinates D (X3, Y3) and an orientation (a vector) to the wall surface lower end coordinates C (X2, Y2) of the target line Lt2 is calculated, and the laser marking instrument 2 is further rotated by the differential angle γ3. Then, the vertical laser light is emitted toward the wall surface lower end coordinates D (X3, Y3), and in this manner, a vertical line Lv3 along the target line Lt3 on the wall surface W is projected.

As described above, for the second and subsequent target lines Lt2, Lt3, the differential angles γ2, γ3 from the vertical lines projected previously are calculated, and the vertical laser light may be emitted after the laser marking instrument 2 has been rotated by the differential angles γ2 and γ3. Thus, for the second and subsequent marking lines, it is not necessary to rotate and install the laser marking instrument 2 or specify the angle relative to the surveying instrument 3 again. With this configuration, even in the case of projecting a plurality of marking lines, the marking process can be easily performed and the efficiency of the marking process can be improved.

Figure 6A:
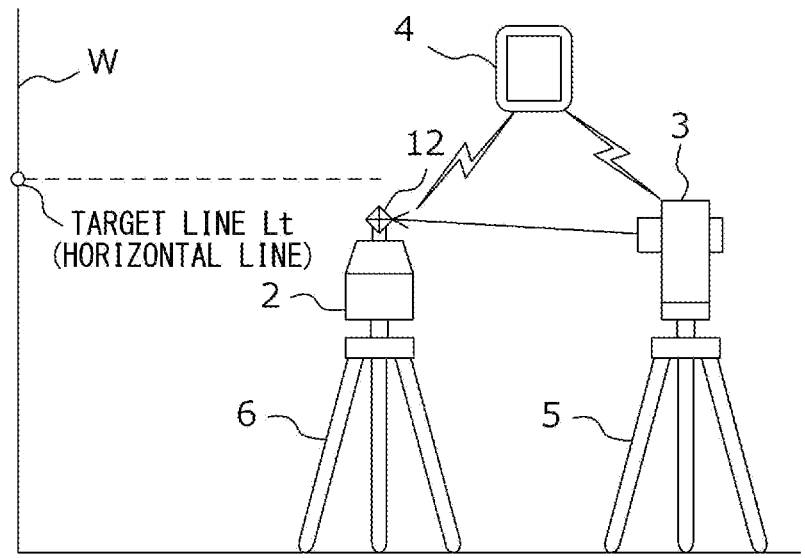
FIGS. 6A and 6B show schematic top views for describing step examples in the case of projecting a horizontal line on a wall surface.
Figure 6B:
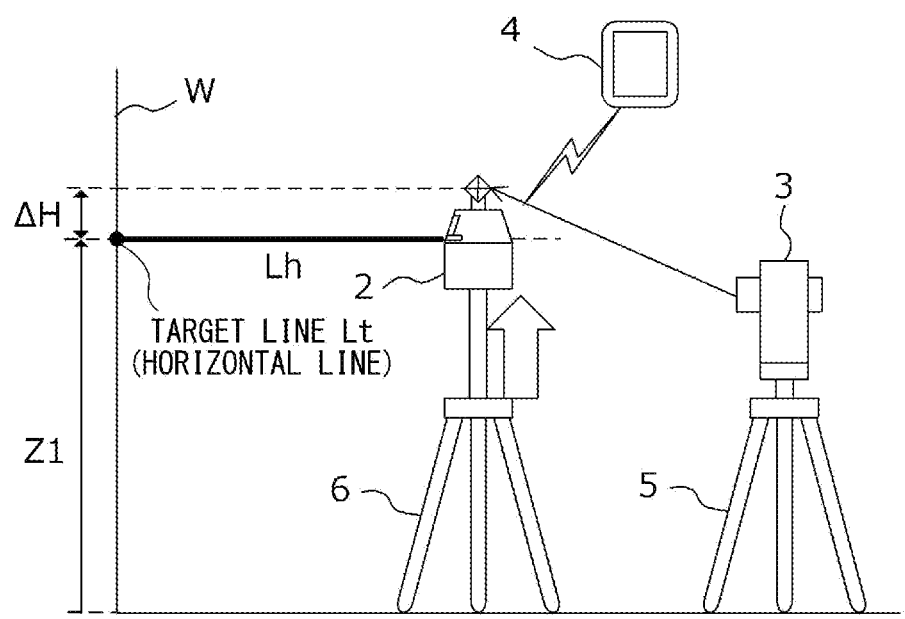

Further, FIG. 6 shows schematic top views for describing step examples (a) and (b) in the case of projecting a vertical line and a horizontal line on the wall surface.

In a case where a target line Lt in a cross shape in the vertical direction and the horizontal direction is set on the wall surface W, a tripod 6 (a support) that can be extended/contracted in the vertical direction and movably supports the laser marking instrument 2 in the vertical direction is first provided at the laser marking instrument 2 as shown in FIG. 6(*a*) so that the laser marking instrument 2 can move in the vertical direction. In addition, positioning of the laser marking instrument 2 in a height direction is performed upon installation of the laser marking instrument 2 at Steps S5 and S8 of the first embodiment.

Specifically, as shown in FIG. 6(*a*), the external controller 54 of the external control terminal 4 acquires the height coordinates Z of the prism 12 of the laser marking instrument 2 by the surveying instrument 3.

Next, as shown in FIG. 6(*b*), the external controller 54 of the external control terminal 4 reads, from the design information, the height position Z1 of the horizontal line of the target line Lt. Then, the height position of the laser marking instrument 2 is adjusted by the tripod 6 until the height position of the prism 12 reaches Z1+ΔH while the prism 12 is being tracked by the surveying instrument 3. The operating person may be, by the external controller 54, guided taking the height position Z1+ΔH as a target position in such adjustment, and height adjustment may be automatically performed by remote operation of the external controller 54 in a case where the tripod 6 is automatically controllable.

After completion of adjustment of the height position of the laser marking instrument 2, the vertical laser light is, after positioning of the vertical line, emitted from the vertical laser emitter 11*v* of the laser marking instrument 2 and the horizontal laser light is emitted from the horizontal laser emitter 11*h* as in the process of the first embodiment, and in this manner, a cross-shaped marking line along the target line Lt can be projected. Note that in a case where only a marking line in the horizontal direction is projected on the wall surface W, height adjustment for the horizontal direction may be performed as described above, the process of the first embodiment may be performed taking optional X, Y coordinates on the wall surface W as a target position, and then, the horizontal laser light may be emitted from the horizontal laser emitter 11*h*. As described above, for the marking line in the horizontal direction, the marking process can be also easily performed utilizing the tripod 6, and the efficiency of the marking process can be improved.

The configurations of the laser marking instrument 2 and the surveying instrument 3 are not limited to those of the first embodiment.

Figure 7:
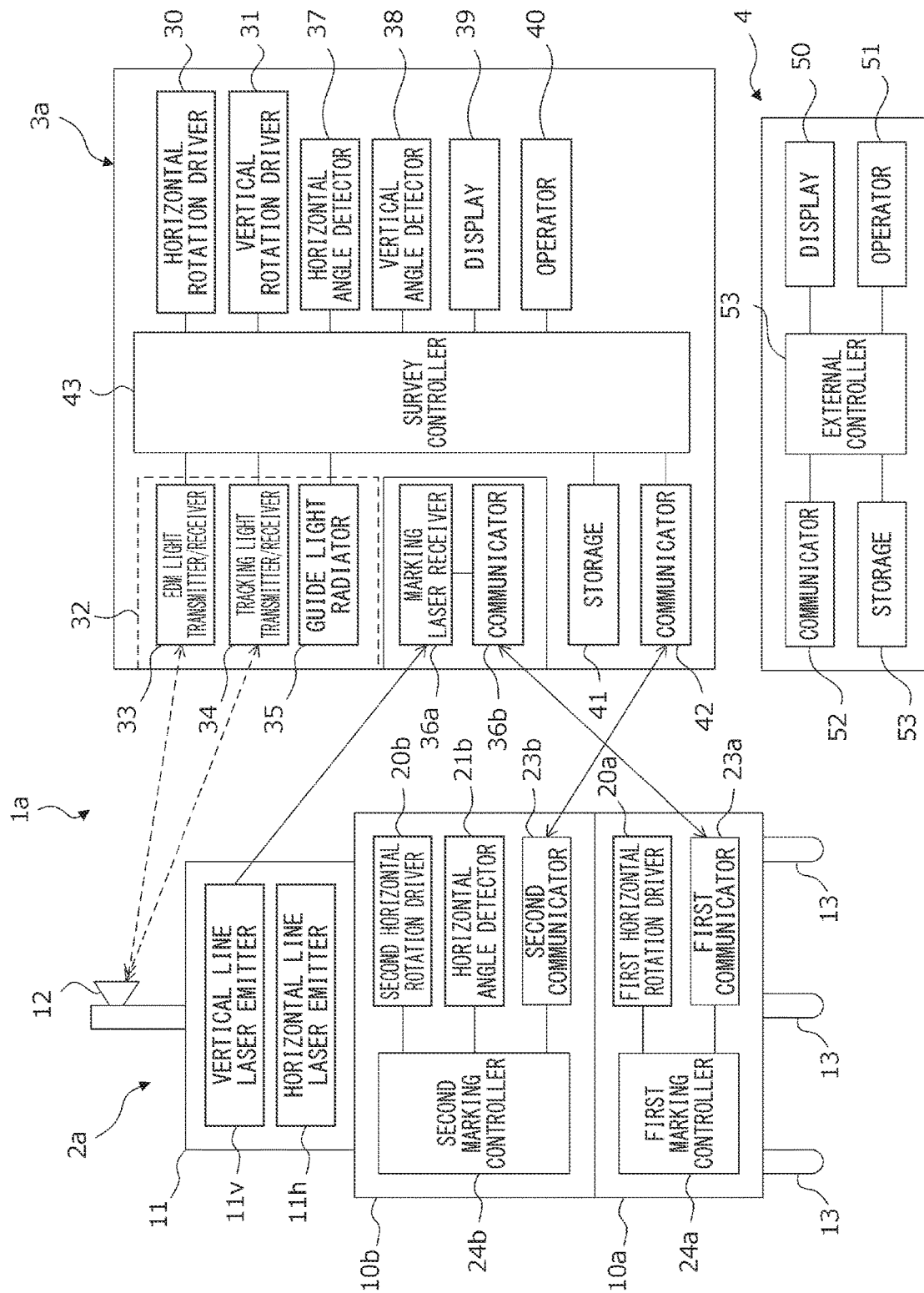
FIG. 7 is a control block diagram of a marking system according to a variation of the first embodiment.

For example, FIG. 7 shows a control block diagram of a marking system according to a variation of the first embodiment. The same reference characters are used to represent the same elements as those of the first embodiment and detailed description thereof will be omitted, and only configurations different from those of the first embodiment will be mainly described.

First, in the marking system 1*a* of the variation, a laser marking instrument 2*a* has separate upper and lower main bodies including a first main body 10a and a second main body 10b. Note that an inclination sensor for leveling is not shown in the figure.

Specifically, the lower first main body 10a having the leg portions 13 at a bottom portion is configured such that a first horizontal rotation driver 20a and a first communicator 23a are electrically connected to a first marking controller 24a. The first marking controller 24a controls the first horizontal rotation driver 20a for searching and tracking a later-described marking laser receiver 36a.

The second main body 10b is rotatably provided on the first main body 10a. The second main body 10b is configured such that a second horizontal rotation driver 20b, a horizontal angle detector 21b, and a second communicator 23b are electrically connected to a second marking controller 24b. The second main body 10b is rotatable in the horizontal direction together with the marking laser emitter 11 by the first horizontal rotation driver 20a of the first main body 10a. Moreover, the second horizontal rotation driver 20b of the second main body 10b can rotatably drive the marking laser emitter 11 in the horizontal direction, and the horizontal angle detector 21b can detect the angle of rotation of the marking laser emitter 11 by the second horizontal rotation driver 20b.

In a surveying instrument 3a of the variation, the marking laser receiver 36a is provided as a separate body without being connected to a survey controller 43 of the surveying instrument 3a. The marking laser receiver 36a as the separate body separately has a communicator 36b.

In the marking system 1a of the variation configured as described above, the steps of the marking method are basically the same as those of the first embodiment.

Referring to FIG. 3, the variation is different in that at Step S8, the first marking controller 24a of the first main body 10a rotates, according to an instruction from the external controller 54 of the external control terminal 4, the marking laser emitter 11 in the horizontal direction by drive of the first horizontal rotation driver 20a while the vertical laser light for projecting the vertical line Lv is being emitted from the vertical laser emitter 11v.

Then, at Step S9, it is determined whether or not the marking laser receiver 36a provided as the separate body at the surveying instrument 3 has sensed the vertical laser light. When the marking laser receiver 36a senses the vertical laser light, information on the sensed vertical laser light is transmitted from the communicator 36b of the marking laser receiver 36a to the first marking controller 24a via the first communicator 23a, and such a determination result is true (Yes).

As Step S10, the first marking controller 24a stops the first horizontal rotation driver 20a to stop rotation of the marking laser emitter 11. Then, the second marking controller 24b of the second main body 10b or the external controller 54 of the external control terminal 4 calculates the first relative angle α as the relative angle between the laser marking instrument 2 and the surveying instrument 3 from the horizontal angle detected by the horizontal angle detector 21b, and the process proceeds to next Step S11.

As Step S11, the external controller 54 of the external control terminal 4 calculates the second relative angle β as the angle relative to the target line Lt based on the design information to calculate the differential angle γ between the first relative angle α calculated at Step S10 and the second relative angle β, and the process proceeds to next Step S12.

Then, as Step S12, after having driven the second horizontal rotation driver 20b to rotate the marking laser emitter 11 to the target line Lt by the differential angle γ calculated at Step S11, the external controller 54 of the external control terminal 4 causes the vertical laser emitter 11v to emit the vertical laser light and causes the horizontal laser emitter 11h to emit the horizontal laser light such that the vertical line Lv and/or the horizontal line Lh are projected, and such a routine ends.

As described above, in the marking system 1a and the marking method in the variation, searching of the surveying instrument 3 with the marking laser receiver 36a is performed by the first main body 10a. Such searching with the first main body 10a and the marking laser receiver 36a can be implemented by application of an existing product, and the second main body 10b that rotates the marking laser emitter 11 by means of the first relative angle α, the second relative angle β, and the differential angle γ is newly added so that the marking system 1a and the marking method in the variation can be easily implemented. Thus, according to this variation, the marking process can be much more easily performed, and the efficiency of the marking process can be improved. Note that the first main body 10a and the second main body 10b may be arranged upside down.

Second Embodiment

Figure 8:
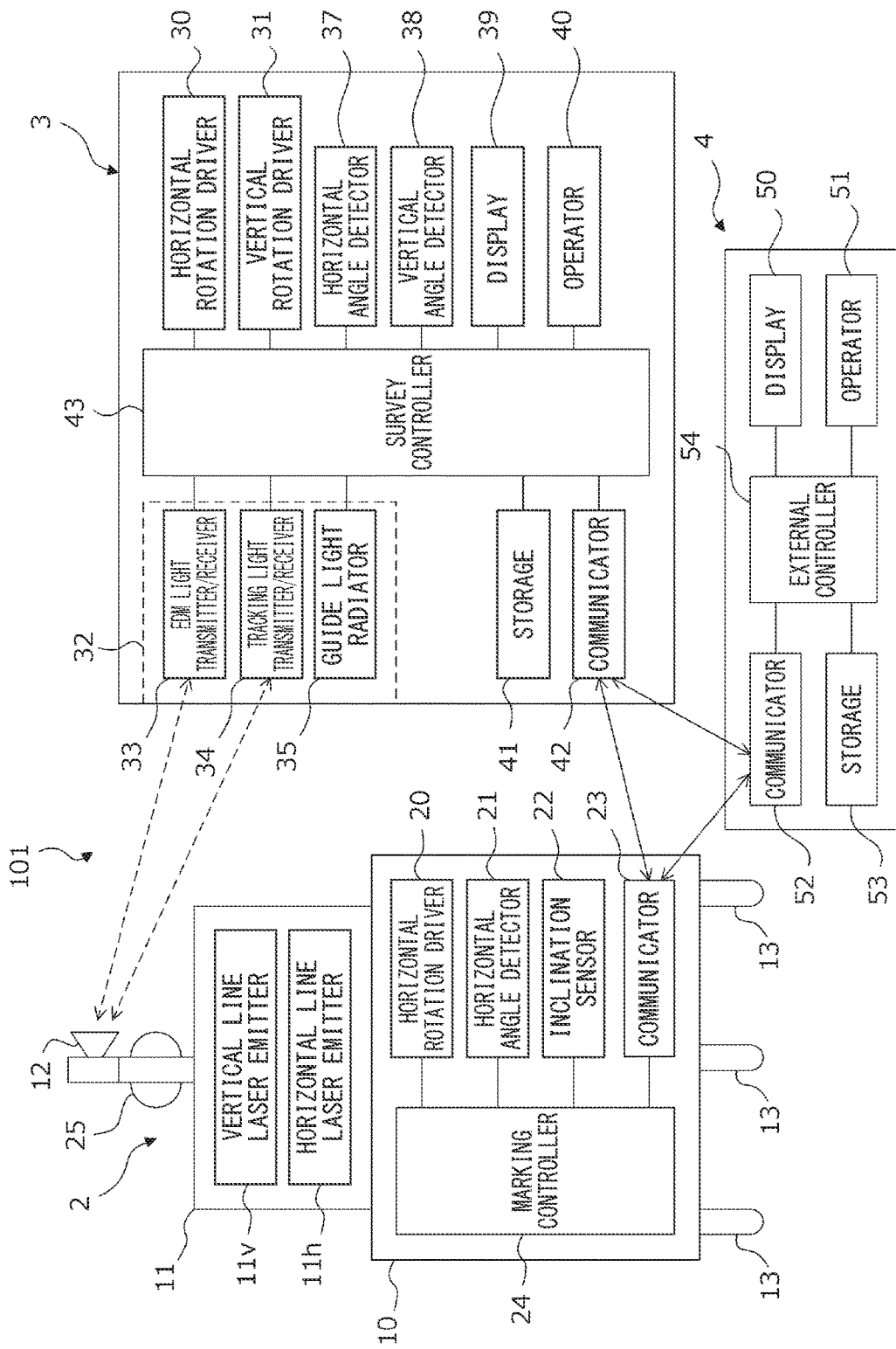
FIG. 8 is a control block diagram of a marking system according to a second embodiment of the present disclosure.

Next, a marking system and a marking method according to a second embodiment will be described. FIG. 8 shows a control block diagram of the marking system according to the second embodiment. The same reference characters are used to represent the same elements as those of the first embodiment and detailed description thereof will be omitted, and only configurations different from those of the first embodiment will be mainly described.

The marking system 101 of the second embodiment is different from the marking system 1 of the first embodiment in that a 360° camera 25 whose viewing angle is 360° in the horizontal direction is provided at a laser marking instrument 2 and no marking laser receiver of a surveying instrument 3 is provided.

The 360° camera 25 is provided between a marking laser emitter 11 and a prism 12 of the laser marking instrument 2. The 360° camera 25 is, as in the prism 12, arranged on the vertical rotation axis of the marking laser emitter 11, and rotates integrally with the marking laser emitter 11. An image (a still image or a moving image) captured by the 360° camera 25 can be transmitted via wireless communication, for example. Note that a vertical relationship between the 360° camera 25 and the prism 12 may be inverted.

Since the surveying instrument 3 has no marking laser receiver, the surveying instrument 3 has a general total station configuration.

In the marking system 101 of the second embodiment configured as described above, an external controller 54 of an external control terminal 4 detects tracking light as light emitted from the surveying instrument 3 from the image P of the 360° camera 25, specifies the position of the surveying instrument 3 relative to the laser marking instrument 2 from the tracking light reflected on the image P captured by the 360° camera and the orientation of the laser marking instrument 2, and calculates a first relative angle α (a first relative angle calculator). Note that the light emitted from the surveying instrument 3 and used for calculation of the relative position of the surveying instrument 3 is not limited to the tracking light and may be, e.g., distance measurement light or guide light as long as the light is reflected on the image P.

Figure 9:
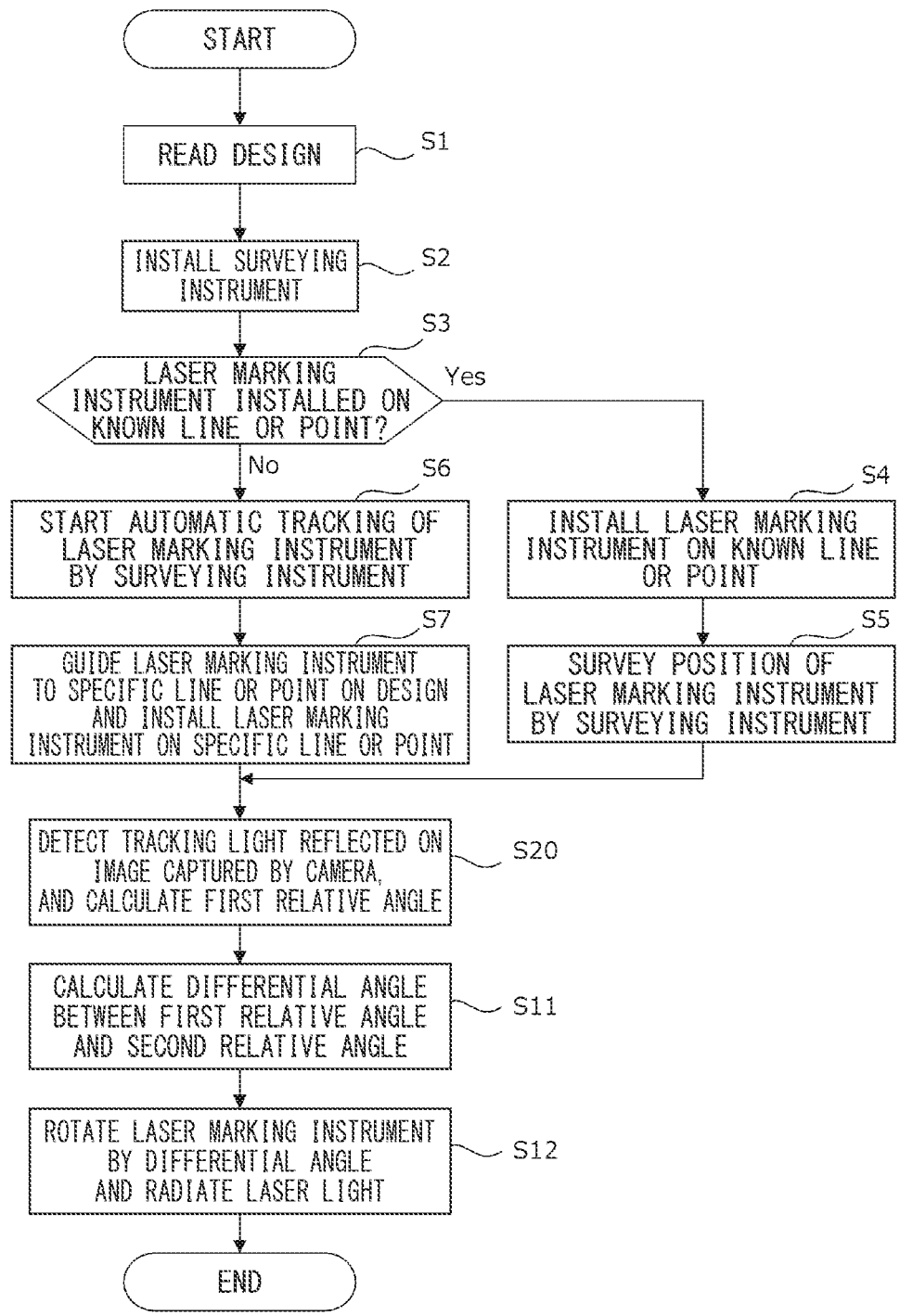
FIG. 9 is a flowchart of a marking method of the second embodiment.

Referring now to FIGS. 9 and 10, FIG. 9 shows a flowchart of the marking method of the second embodiment, and FIG. 10 shows schematic top views for describing step examples (a) and (b) of the marking method of the second embodiment. Hereinafter, the marking method of the second embodiment will be described along the flowchart of FIG. 9 while FIG. 10 is referred in the middle. Note that the same reference characters are used to represent the same processes as those of the first embodiment and detailed description thereof will be omitted, and only processes different from those of the first embodiment will be mainly described.

The process from Steps S1 to S7 is similar to that of the first embodiment, and the process of Step S20 is performed in the second embodiment instead of Steps S8 to S10.

At Step S20, the external controller 54 of the external control terminal 4 acquires an image P1 of the 360° camera 25 of the laser marking instrument 2, and detects the tracking light emitted from the surveying instrument 3 and reflected on such an image. Then, the first relative angle α as the relative angle between the surveying instrument 3 and the laser marking instrument 2 is calculated from the position of such tracking light.

Figures 10A, 10B:
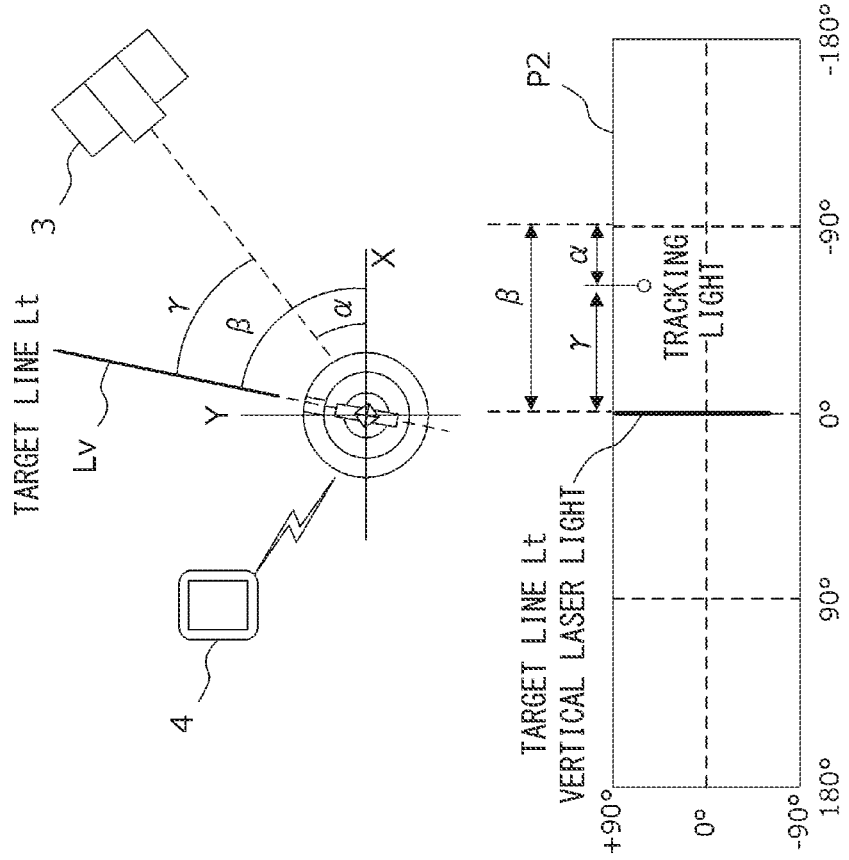
FIGS. 10A and 10B show schematic top views and image examples for describing step examples of the marking method of the second embodiment.

For example, FIG. 10(a) shows the same situation as that of FIG. 4(b) of the first embodiment, but the tracking light is reflected as a single point on the image P1 captured by the 360° camera 25 in the second embodiment. An angle between such a point of the tracking light and the orientation (in FIG. 10, the orientation of vertical laser light is 0°) of the laser marking instrument 2 is the first relative angle α.

Steps after Step S11 are similar to those of the first embodiment, and at Step S11, the external controller 54 of the external control terminal 4 calculates a second relative angle β as an angle relative to a target line Lt based on design information to calculate a differential angle γ between the first relative angle α calculated at Step S10 and the second relative angle β.

Then, at Step S12, after having driven the horizontal rotation driver 20 to rotate a marking laser emitter 11 from the position of the surveying instrument 3, i.e., the position of the tracking light reflected on the image of the 360° camera, to the target line Lt by the differential angle γ, the external controller 54 of the external control terminal 4 causes a vertical laser emitter 11v to emit the vertical laser light and causes a horizontal laser emitter 11h to emit horizontal laser light such that a vertical line Lt and/or a horizontal line Lh are projected, and such a routine ends.

Specifically, in a state in which the vertical laser light is emitted to the target line Lt as shown in FIG. 10(b), the laser marking instrument 2 directs to the target line Lt as in from the image P1 shown in FIG. 10(a) to an image P2.

As described above, in the marking system 101 and the marking method of the second embodiment, only the 360° camera 25 is provided at the laser marking instrument 2 without the need for providing the marking laser receiver at the surveying instrument 3 as in the first embodiment so that the marking process can be performed. With this configuration, effects similar to those of the first embodiment can be achieved and the position relative to the surveying instrument 3 can be detected from the position of the tracking light reflected on the image P captured by the 360° camera 25, and therefore, the efficiency of the marking process can be further enhanced without the need for searching the surveying instrument 3 by rotation of the laser marking instrument 2.

With the above-described configuration, in the marking system 101 and the marking method according to the second embodiment, the marking process can be more easily performed, and the efficiency of the marking process can be improved.

The embodiments of the present disclosure have been described above, but the aspects of the present disclosure are not limited to these embodiments.

For example, in each embodiment and the variation above, the external controller 54 of the external control terminal 4 mainly calculate the first relative angle α, the second relative angle β, and the differential angle γ, but the survey controller of the surveying instrument may have such a function.

The laser marking instrument of the second embodiment may be configured such that a first main body and a second main body are separated from each other as in the laser marking instrument 2a of the variation of the first embodiment. Note that in this case, the first main body and the second main body may be arranged upside down as in the variation of the first embodiment as described above.

In the first embodiment and the variation above, the marking laser receiver 36 is provided at the lower portion of the main body of the surveying instrument 3, but arrangement of the marking laser receiver is not limited to such a position and the marking laser receiver may be provided at any location on a front surface of the surveying instrument. Note that in a case where the marking laser receiver is arranged at a position (an offset position) shifted from the vertical line of the EDM light transmitter/receiver or the tracking light transmitter/receiver, such an offset is corrected to calculate the first relative angle α.

DESCRIPTION OF REFERENCE CHARACTERS 1, 1a, 101 Marking System
2, 2a Laser Marking Instrument
3, 3a Surveying Instrument
4 External Control Terminal
5 Tripod
6 Tripod (Support)
10, 10a, 10b Main Body
11 Marking Laser Radiator
11v Vertical Laser Emitter
11h Horizontal Laser Emitter
12 Prism (Survey Target)
13 Leg Portion
20 Horizontal Rotation Driver
20a First Horizontal Rotation Driver
20b Second Horizontal Rotation Driver
21 Horizontal Angle Detector
22 Inclination Sensor
23 Communicator
23a First Communicator
23b Second Communicator
24 Marking Controller
25 360° Camera
30 Horizontal Rotation Driver
31 Vertical Rotation Driver
32 Telescope
33 EDM Light Transmitter/Receiver
34 Tracking Light Transmitter/Receiver
35 Guide Light Radiator
36 Marking Laser Receiver
37 Horizontal Angle Detector
38 Vertical Angle Detector
39 Display
40 Operator
41 Storage 42 Communicator
43 Survey Controller
50 Display
51 Operator
52 Communicator
53 Storage
54 External Controller (First Relative Angle Calculator, Second Relative Angle Calculator, Differential Angle Calculator, Guide)

What is claimed is:

1. A marking system comprising:
a surveying device that is able to survey a position of a survey target;
a marking laser emitter that is provided with the survey target and is able to emit laser light to project a laser marking line on a target portion;
a first relative angle calculator that is able to specify a direction of the surveying device with respect to the marking laser emitter to calculate a first relative angle as a horizontal angle of the surveying device relative to the marking laser emitter;
a second relative angle calculator that is able to specify a direction of a target marking position with respect to the marking laser emitter to calculate a second relative angle as a horizontal angle of the target marking position relative to a laser radiation direction of the marking laser emitter;
a differential angle calculator that calculates a differential angle between the first relative angle and the second relative angle; and
a horizontal rotation driver that rotates the marking laser emitter with respect to the specified direction of the surveying device by the differential angle.

2. The marking system of claim 1, wherein
the first relative angle calculator is able to acquire information indicating that the surveying device has sensed reception of the laser light emitted from the marking laser emitter, and
the direction of the surveying device with respect to the marking laser emitter is specified in such a manner that the marking laser emitter is rotated by the horizontal rotation driver while radiating the laser light and rotation of the marking laser emitter by the horizontal rotation driver is stopped in response to acquisition of the information indicating that the surveying device has sensed reception of the laser light.

3. The marking system of claim 1, wherein
the first relative angle calculator is a camera that is able to detect light emitted from the surveying device and has a viewing angle of 360° in a horizontal direction, and
the direction of the surveying device with respect to the marking laser emitter is specified from the light reflected on an image captured by the camera and an orientation of the marking laser emitter.

4. The marking system of claim 1, further comprising:
a guiding device that specifies a predetermined position at which the marking laser emitter is to be installed from design information and issues a guiding instruction based on a difference between a position of the marking laser emitter obtained from a survey result of the surveying device and the predetermined position.

5. The marking system of claim 1, wherein
the survey target is arranged on an axis of rotation of the marking laser emitter by the horizontal rotation driver.

6. The marking system of claim 1, further comprising:
a support that movably supports the marking laser emitter in a vertical direction.

7. A marking method in a marking system including a surveying device that is able to survey a position of a survey target and a marking laser emitter that is provided with the survey target and is able to emit laser light to project a laser marking line on a target portion, the method comprising the steps of:
first relative angle calculation of specifying a direction of the surveying device with respect to the marking laser emitter to calculate a first relative angle as a horizontal angle of the surveying device relative to the marking laser emitter;
second relative angle calculation of specifying a direction of a target marking position with respect to the marking laser emitter to calculate a second relative angle as a horizontal angle of the target marking position relative to a laser radiation direction of the marking laser emitter;
differential angle calculation of calculating a differential angle between the first relative angle and the second relative angle; and
horizontal rotation driving of rotating the marking laser emitter with respect to the specified direction of the surveying device by the differential angle.

* * * * *